United States Patent
Väisänen

(10) Patent No.: US 9,448,711 B2
(45) Date of Patent: Sep. 20, 2016

(54) MOBILE COMMUNICATION TERMINAL AND ASSOCIATED METHODS

(75) Inventor: Matti Väisänen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 534 days.

(21) Appl. No.: 11/249,156

(22) Filed: Oct. 12, 2005

(65) Prior Publication Data
US 2006/0262136 A1 Nov. 23, 2006

Related U.S. Application Data

(63) Continuation-in-part of application No. 11/135,624, filed on May 23, 2005.

(51) Int. Cl.
*G06F 3/0485* (2013.01)
*G06F 9/00* (2006.01)
*G06F 17/30* (2006.01)

(52) U.S. Cl.
CPC ............... *G06F 3/0485* (2013.01); *G06F 9/00* (2013.01); *G06F 17/30905* (2013.01)

(58) Field of Classification Search
CPC ............... G06F 2203/04806; G06F 17/30274; G06F 17/30873
USPC .................................. 715/788, 781, 764, 864
See application file for complete search history.

(56) References Cited

U.S. PATENT DOCUMENTS

| | | | |
|---|---|---|---|
| 4,969,097 A | 11/1990 | Levin | |
| 5,375,201 A | 12/1994 | Davoust | |
| 5,523,775 A | 6/1996 | Capps | |
| 5,543,591 A | 8/1996 | Gillespie et al. | |
| 5,623,681 A | 4/1997 | Rivette et al. | |
| 5,675,753 A | 10/1997 | Hansen et al. | |
| 5,689,666 A | 11/1997 | Berquist et al. | |

(Continued)

FOREIGN PATENT DOCUMENTS

| EP | 0 632 637 A1 | 1/1995 |
|---|---|---|
| EP | 0 671 682 A2 | 3/1995 |

(Continued)

OTHER PUBLICATIONS

"Glimpse: A Novel Input Model for Multi-Level Devices", Clifton Forlines, et al., Mitsubishi Electric Research Laboratories, Dec. 2005, pp. 1-5.

(Continued)

*Primary Examiner* — Jeffrey A Gaffin
*Assistant Examiner* — Sabrina Greene
(74) *Attorney, Agent, or Firm* — Alston & Bird LLP

(57) ABSTRACT

It is disclosed a method for displaying previously visited hypermedia pages in a hypermedia browser application executing on a mobile communication terminal comprising a display. The method comprises the steps of: rendering a first hypermedia page on said display, accepting a first input to modify rendering of said first hypermedia page according to a first content display mode, rendering said first hypermedia page according to said first content display mode, accepting a second input to render a second hypermedia page, rendering a second hypermedia page, accepting a third input to again render said first hypermedia page, and rendering said first hypermedia page according to said first content display mode.

10 Claims, 8 Drawing Sheets

| Url | Page Layout | Frame mode | Zoom factor | Text sel. | ... |
|---|---|---|---|---|---|
| http://www.w3c.org | Normal | Normal | 150 | 34,50 | |
| http://www.history.domain | Optimized | Normal | 100 | 0,0 | |
| http://www.history.domain/greece.html | Normal | Merged | 100 | 0,0 | |
| http://www.history.domain/rome.html | Normal | Merged | 100 | 112-117 | |
| http://www.caesar.domain | Normal | Normal | 100 | 0,0 | |
| http://www.caesar.domain/galliae | Normal | Normal | 200 | 0,0 | |
| http://www.plays.domain/hamlet | Optimized | Normal | 100 | 0,0 | |

Columns labeled 90, 91, 92, 93, 94, 95, 96.

(56) References Cited

U.S. PATENT DOCUMENTS

| | | |
|---|---|---|
| 5,703,620 A | 12/1997 | Keyson |
| 5,724,457 A | 3/1998 | Fukushima |
| 5,801,771 A | 9/1998 | Ohwaki et al. |
| 5,805,159 A | 9/1998 | Bertram et al. |
| 5,864,340 A | 1/1999 | Bertram et al. |
| 5,953,541 A | 9/1999 | King et al. |
| 5,959,629 A | 9/1999 | Masui |
| 5,995,084 A | 11/1999 | Chan et al. |
| 5,999,176 A | 12/1999 | Kamper |
| 6,002,390 A | 12/1999 | Masui |
| 6,008,817 A | 12/1999 | Gilmore, Jr. |
| 6,173,297 B1 | 1/2001 | Moon et al. |
| 6,208,345 B1 | 3/2001 | Sheard et al. |
| 6,278,465 B1 | 8/2001 | Nielsen |
| 6,321,158 B1 | 11/2001 | DeLorme et al. |
| 6,337,698 B1 | 1/2002 | Keely, Jr. et al. |
| 6,570,583 B1 | 5/2003 | Kung et al. |
| 6,640,185 B2 | 10/2003 | Yokota et al. |
| 6,862,712 B1 | 3/2005 | Nakagawa et al. |
| 7,006,074 B2 | 2/2006 | Chesters |
| 7,009,599 B2 | 3/2006 | Pihlaja |
| 7,107,204 B1 | 9/2006 | Liu et al. |
| 7,171,353 B2 | 1/2007 | Trower, II et al. |
| 7,194,404 B1 | 3/2007 | Babst et al. |
| 7,225,407 B2* | 5/2007 | Sommerer et al. ........... 715/738 |
| 7,228,268 B2 | 6/2007 | Xun |
| 7,254,527 B2 | 8/2007 | Xun |
| 7,315,809 B2 | 1/2008 | Xun |
| 7,327,349 B2* | 2/2008 | Robbins et al. .............. 345/156 |
| 8,015,259 B2* | 9/2011 | Swahn .......................... 709/217 |
| 2001/0045949 A1 | 11/2001 | Chithambaram et al. |
| 2002/0015042 A1 | 2/2002 | Robotham et al. |
| 2002/0024506 A1 | 2/2002 | Flack et al. |
| 2002/0052900 A1 | 5/2002 | Freeman |
| 2002/0103698 A1 | 8/2002 | Cantrell |
| 2002/0130904 A1 | 9/2002 | Becker et al. |
| 2002/0156864 A1 | 10/2002 | Kniest |
| 2002/0186257 A1 | 12/2002 | Cadiz et al. |
| 2003/0043114 A1 | 3/2003 | Silfverberg et al. |
| 2003/0045331 A1* | 3/2003 | Montebovi ................... 455/566 |
| 2003/0098891 A1 | 5/2003 | Molander |
| 2003/0193524 A1 | 10/2003 | Bates et al. |
| 2004/0061716 A1 | 4/2004 | Cheung et al. |
| 2004/0178997 A1 | 9/2004 | Gillespie et al. |
| 2004/0239681 A1 | 12/2004 | Robotham et al. |
| 2005/0012723 A1 | 1/2005 | Pallakoff |
| 2005/0044506 A1* | 2/2005 | Makela ......................... 715/801 |
| 2005/0052427 A1 | 3/2005 | Wu et al. |
| 2005/0195221 A1 | 9/2005 | Berger et al. |
| 2005/0223308 A1 | 10/2005 | Gunn et al. |
| 2005/0283364 A1 | 12/2005 | Longe et al. |
| 2006/0020904 A1 | 1/2006 | Aaltonen et al. |
| 2006/0026521 A1 | 2/2006 | Hotelling et al. |
| 2006/0026535 A1* | 2/2006 | Hotelling et al. ............ 715/863 |
| 2006/0026536 A1 | 2/2006 | Hotelling et al. |
| 2006/0095842 A1 | 5/2006 | Lehto |
| 2006/0097993 A1 | 5/2006 | Hietala et al. |
| 2006/0101005 A1 | 5/2006 | Yang et al. |
| 2006/0112346 A1 | 5/2006 | Miksovsky et al. |
| 2006/0161870 A1 | 7/2006 | Hotelling et al. |
| 2006/0161871 A1 | 7/2006 | Hotelling et al. |
| 2006/0267967 A1 | 11/2006 | Hinckley et al. |
| 2006/0274051 A1 | 12/2006 | Longe et al. |
| 2007/0263007 A1 | 11/2007 | Robotham et al. |

FOREIGN PATENT DOCUMENTS

| | | |
|---|---|---|
| EP | 1 517 228 A | 3/2005 |
| EP | 1 574 971 A1 | 9/2005 |
| JP | 10-340178 | 12/1998 |
| JP | 2000163444 | 6/2000 |
| JP | 2002-323850 A | 11/2002 |
| JP | 2003-282922 | 10/2003 |
| JP | 2004-206300 A | 7/2004 |
| JP | 2004-265142 | 9/2004 |
| KR | 2019980009337 | 4/1998 |
| KR | 2005-0027892 A | 3/2005 |
| WO | 02/08881 | 1/2002 |
| WO | WO 02/08881 A | 1/2002 |

OTHER PUBLICATIONS

"Roll Up Window with Your Middle Mouse Button and Wheel Button Click", www.shelltoys.com/mouse_software/rollup_window.html, Jun. 15, 2005, p. 1.

"Matchbox XII", Open Source, http://freshmeat.net/projects/matchbox/, Jun. 15, 2005, pp. 1-2.

Acrobat Reader® 7.0, Adobe Systems Inc., Public product.

OS X, Apple Computer Inc., Public product.

Windows, Microsoft Corporation, Public product.

Series 90, Nokia, Public product.

7710 Communicator, Nokia, Public product.

Symbian OS, Symbian Ltd., Public product.

Palm OS, PalmSource Inc., Public product.

Photoshop, Adobe Systems Inc., Public product.

Imageready, Adobe System Inc., Public product.

Picsel web browser, Picsel Technologies Ltd., Public product.

Opera Browser, Opera Software AFA, Public product.

Windows mobile, Microsoft Corporation, Public product.

Embedded Linux, Embedded Linux Consortium, Public product.

Internet explorer, Microsoft Corporation, Public product.

Netscape browser, Netscape Communications Corp., Public product.

Firebird/Firefox, Mozilla, Public Product.

Pocket PC OS, Microsoft Corporation, Public Product.

Series 60, Nokia, Public Product.

Palm Inc., "Handbook for the Palm Zire 71 Handheld." 2003 <http://www.palm.com/us/support/handbooks/zire71/zire71_hb_ENG.pdf>.

Palm Inc., "using your Treo." 2007 <http://www.palm.com/us/support/handbooks/treo/treo600gsm_UG.pdf>.

Textware Solutions, "Fitaly Virtual Options and Advanced Features." Mar. 13, 2004 <http://webarchive.org/web/20040313051005/http://fitaly.com/fitalyvirtual3/fitalysetup.htm#mru>.

Apple Computer Inc. "Dashboard—Handy widgets at your command." May 7, 2005 <http://webarchive.org/web/2005050720223/http://www.apple.com/macosx/features/dashboard/>.

Nintendo. "Nintendo DS Technical Specs." Nov. 12, 2004 <http:web.archive.org/web/20041112133534/http://www.nintendo.com/techspecds>.

Amazon.com: Palm Zire 71 Handheld: Electronics. <http://www.amazon.com/Palm-P80720US-PalmOne-Zire-Handheld/dp/B00008WFVI> 2007.

Red Hat. "Red Hat Linux 6.1: The Official Red Hat Linux Getting Started Guide, Chapter 11. The Enlightenment Window Manager." Oct. 18, 2003. <http://web.archive.org/web/20031018155954/http://www.redhat.com/docs/manuals/linux/RHL-6.1-Manual/getting-started-guide/ecapplet.html>.

Apple Computer Inc. "Apple Unleashes "Tiger" Friday at 6:00 p.m." Apr. 28, 2005 <www.apple.com/pr/library/2005/apr/28tiger.html>.

International Search Report, PCT/IB2006/001330, mailed Jul. 9, 2007.

Korean Office Action dated Sep. 16, 2010.

Japanese Office Action dated Nov. 16, 2010.

Kazumi Takei, Manual on How to Make Thorough Use of Visor Deluxe, First Edition, Media Tech Publishing, Inc., Kazuo Sato, Oct. 18, 2000, vol. 1, pp. 30-31, 44, ISBN: 4-89627-090-8.

English Translation of Korean Office Action dated May 31, 2011.

International Search Report and Written Opinion from International Application No. PCT/IB2007/001304, dated Jun. 26, 2008.

Office Action for Chinese Application No. 200780024811.3 dated Nov. 3, 2011.

Office Action for Japanese Application No. 2008-512937 dated Aug. 16, 2011.

Office Action for Russian Application No. 2007143132/09 dated Jan. 22, 2010.

(56) References Cited

OTHER PUBLICATIONS

Office Action for Singapore Application No. 201003586-3 dated Mar. 8, 2011.
Office Action for U.S. Appl. No. 11/135,624 dated Jun. 19, 2014.
International Preliminary Report on Patentability and Written Opinion for Application No. PCT/IB2006/001330 dated Nov. 23, 2007.
International Preliminary Report on Patentability (Chapter II) for Application No. PCT/IB2007/001304 dated Feb. 6, 2009.
Office action for European Application No. EP 06 755 899.9 dated Mar. 18, 2009.
Office Action for European Application No. 06 755 899.9 dated May 12, 2015.

* cited by examiner

| Url | Page Layout | Frame mode | Zoom factor | Text sel. | ... |
|---|---|---|---|---|---|
| http://www.w3c.org | Normal | Normal | 150 | 34,50 | |
| http://www.history.domain | Optimized | Normal | 100 | 0,0 | |
| http://www.history.domain/greece.html | Normal | Merged | 100 | 0,0 | |
| http://www.history.domain/rome.html | Normal | Merged | 100 | 112-117 | |
| http://www.caesar.domain | Normal | Normal | 100 | 0,0 | |
| http://www.caesar.domain/galliae | Normal | Normal | 200 | 0,0 | |
| http://www.plays.domain/hamlet | Optimized | Normal | 100 | 0,0 | |

*Fig. 7*

MOBILE COMMUNICATION TERMINAL AND ASSOCIATED METHODS

CROSS-REFERENCE TO RELATED APPLICATIONS

This application claims the benefit of and is a continuation-in-part application of U.S. patent application Ser. No. 11/135,624 filed on May 23, 2005, status pending, the disclosure of which is incorporated herein by reference.

FIELD OF THE INVENTION

The present invention relates generally to browsers of mobile communication terminals, and more particularly to rendering of previously viewed web pages in web browsers of mobile communication terminals.

BACKGROUND OF THE INVENTION

Mobile communication terminals have changed dramatically in the last decade. With the first 2G terminals, the main purpose was to make normal phone calls. With the introduction of mobile communication technologies such as 2.5G (GPRS), CDMA2000 and UMTS, mobile communication terminals now not only facilitate voice communication, but also digital communication such as text and multimedia messaging, as well as browsing content provided by Internet servers.

While mobile communication terminals thus now have the ability to render web pages, due to user requirements on size and weight of the mobile communication terminals, the user interface is still generally limited compared to personal computers. In particular, screens are in general smaller and input methods are in general more limited, compared to personal computers. Web pages published on the Internet have generally been authored in a manner intended to be displayed on a personal computer, often resulting in improper display of web pages on mobile communication terminals.

A problem therefore exists on how to display web pages in a more efficient and user friendly manner on mobile communication terminals.

SUMMARY OF THE INVENTION

In view of the above, an objective of the invention is to solve or at least reduce the above-identified and other problems and shortcomings with the prior art, and to provide improvements to a mobile communication terminal.

A first aspect of the invention is a method for displaying previously visited hypermedia pages in a hypermedia browser application executing on a mobile communication terminal comprising a display, the method comprising the steps of:

rendering a first hypermedia page on said display, accepting a first input to modify rendering of said first hypermedia page according to a first new content display mode, rendering said first hypermedia page according to said first new content display mode, accepting a second input to render a second hypermedia page, rendering a second hypermedia page, accepting a third input to again render said first hypermedia page, and rendering said first hypermedia page according to said first new content display mode.

This provides a method where user modifications to content display modes are saved, reducing the need to re-modify the content display of a page when re-visiting the page.

Said content display mode may include a zoom factor. Said content display mode may further include a frame display mode. Said content display mode may yet further include a mode when a text of said first hypermedia page is selected. Said content display mode may yet further include a page layout mode. Saving each of, or a combination of, these specific content modes with page history provides a better browsing experience for the user.

Said step of rendering a second hypermedia page may involve rendering said second hypermedia page according to said first new content display mode. Advantageously, this allows any content mode modification made by the user to be the default when navigating to other pages.

The method may include the further steps, after said step of rendering a second hypermedia page, and before said step of accepting a third input, of:

accepting a fourth input to modify rendering of said second hypermedia page according to a second new content display mode, and rendering said second hypermedia page according to said second new content display mode.

In other words, modifications of content display modes are possible of later pages, without affecting content display modes stored with history items.

Said third input may be an input to navigate back through browser history.

Said third input may be an input to navigate forward through browser history.

Said hypermedia pages may represent at least one type of content selected from the group consisting of: html content, wml content, sgml content and xml content.

A second aspect of the invention is a mobile communication terminal capable of executing a hypermedia browser application, said hypermedia browser application rendering hypermedia pages on a display of said mobile communication terminal, said mobile communication terminal comprising:

means for rendering a first hypermedia page on said display, means for accepting a first input to modify rendering of said first hypermedia page according to a first new content display mode, means for rendering said first hypermedia page according to said first new content display mode, means accepting a second input to render a second hypermedia page, means for rendering a second hypermedia page, means for accepting a third input to again render said first hypermedia page, and means for rendering said first hypermedia page according to said first new content display mode.

This provides a mobile communication terminal where user modifications to content display modes are saved, reducing the need to re-modify the content display of a page when re-visiting the page.

A third aspect of the invention is a computer program product, directly loadable into a memory of a digital computer, comprising software code portions for performing a method according to the first aspect of the invention. This provides a computer program product where user modifications to content display modes are saved, reducing the need to re-modify the content display of a page when re-visiting the page.

Said first and second hypermedia pages are preferably, but not necessarily, web (www) pages and/or wap pages, i.e. digital content expressed in a html or wml language suitable for browsing in a web and/or wap browser. Other markup languages may also be used to represent the digital content, such as sgml, xml or any other suitable markup language. The term "page" denotes digital content, at least a part of which is presentable on a display to be viewed by a user.

Generally, the above objectives and purposes are achieved by methods, mobile communication terminals and computer program products according to the attached independent patent claims.

Other objectives, features and advantages of the present invention will appear from the following detailed disclosure, from the attached dependent claims as well as from the drawings.

BRIEF DESCRIPTION OF THE DRAWINGS

Embodiments of the invention will now be described in more detail, with reference to the enclosed drawings.

FIG. 7 shows an exemplary data table comprising history data according to an embodiment of the present invention.

DETAILED DESCRIPTION OF THE INVENTION

Figure 1:
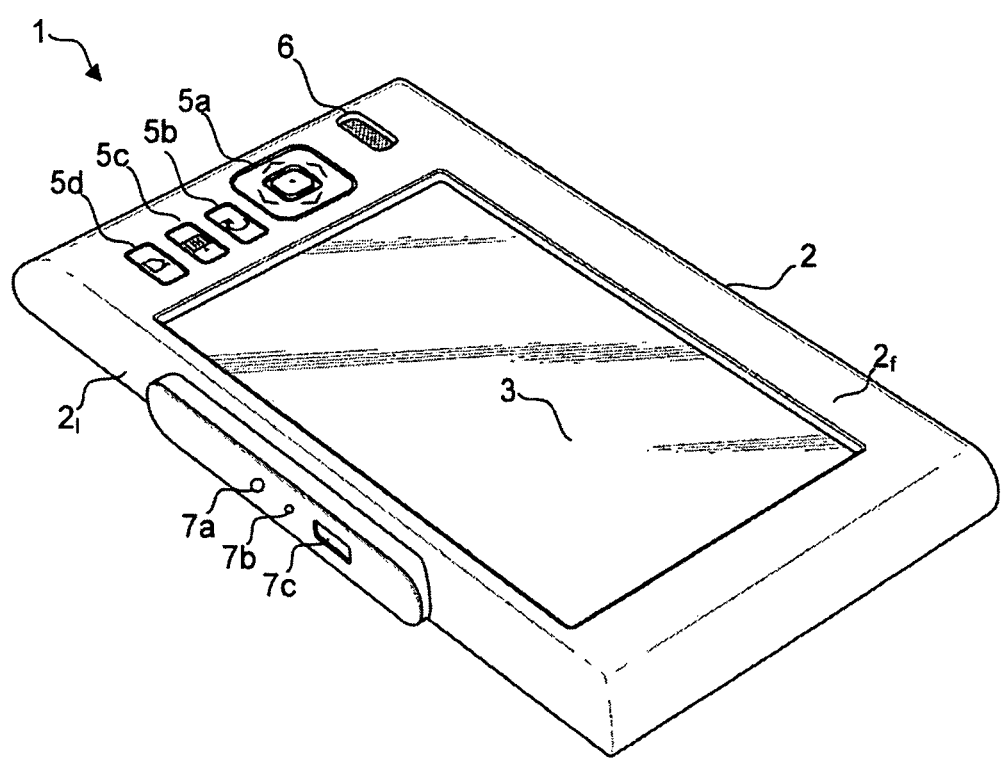
FIG. 1 is a perspective view of a mobile communication terminal in the form of a pocket computer according to one embodiment of the present invention.

FIG. 1 is a perspective view of a mobile communication terminal in the form of a pocket computer according to one embodiment of the present invention.

The pocket computer 1 of the illustrated embodiment comprises an apparatus housing 2 and a display 3 provided at the surface of a front side 2f of the apparatus housing 2. Next to the display 3 a plurality of hardware keys 5a-d are provided, as well as a speaker 6.

Key 5a is a five-way navigation key, i.e. a key which is depressible at four different peripheral positions to command navigation in respective orthogonal directions ("up", "down", "left", "right") among information shown on the display 3, as well as depressible at a center position to command selection among information shown on the display 3. Key 5b is a cancel key, key 5c is a menu or options key, and key 5d is a home key.

At the surface of a short side 21 of the apparatus housing 2, there is provided an earphone audio terminal 7a, a mains power terminal 7b and a wire-based data interface 7c in the form of a serial USB port.

Figure 2:
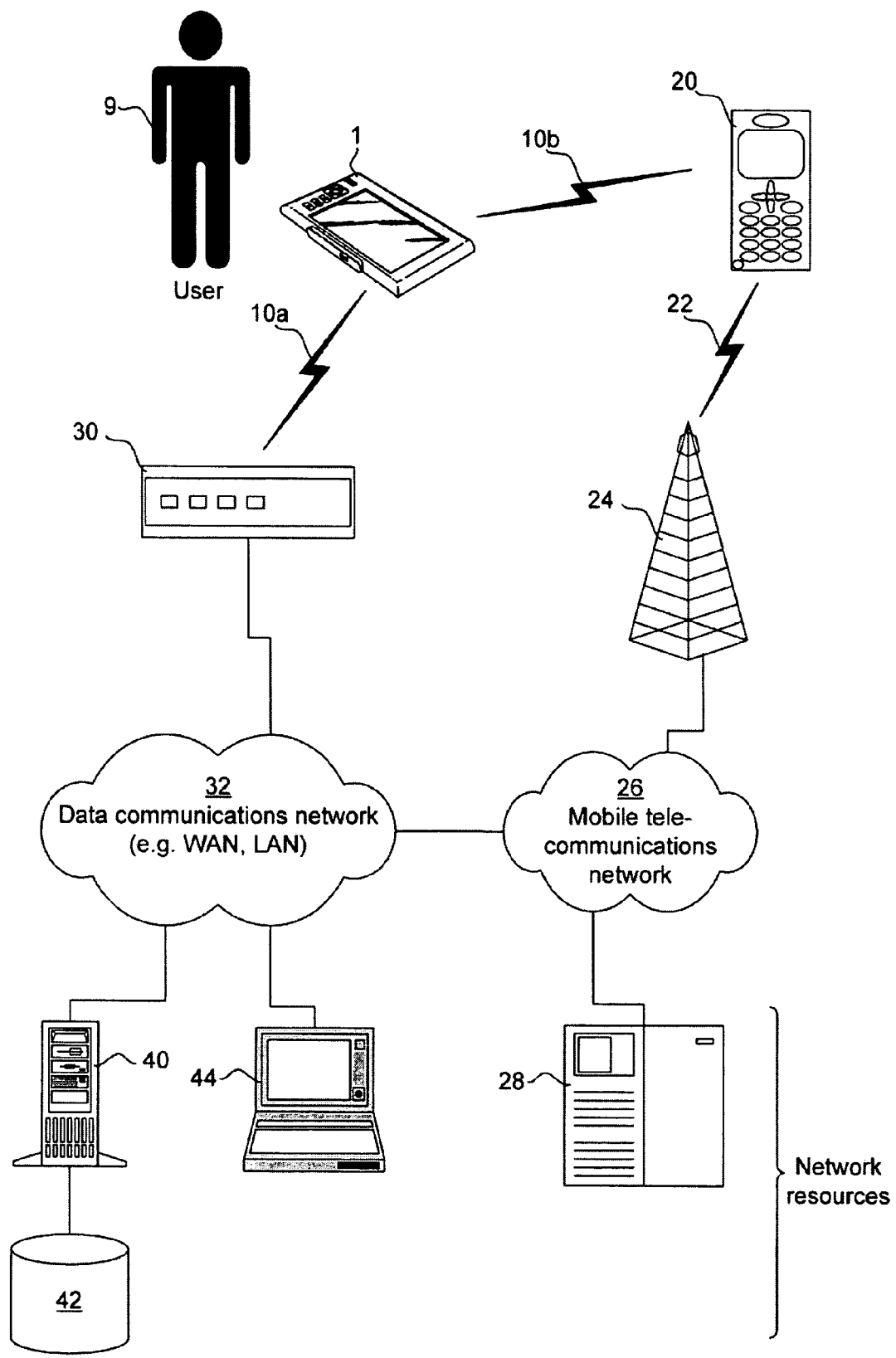
FIG. 2 illustrates a computer network environment in which the pocket computer of FIG. 1 advantageously may be used for providing wireless access for the user to network resources and remote services.

FIG. 2 illustrates a computer network environment in which the pocket computer 1 of FIG. 1 advantageously may be used for providing wireless access for the user to network resources and remote services. To allow portable use, the pocket computer 1 has a rechargeable battery (not shown). The pocket computer according to an embodiment of the invention also has at least one interface 55 (FIG. 3) for wireless access to network resources on at least one digital network. The pocket computer 1 may connect to a data communications network 32 by establishing a wireless link via a network access point 30, such as a WLAN (Wireless Local Area Network) router. The data communications network 32 may be a wide area network (WAN), such as the Internet or some part thereof, a local area network (LAN), etc. A plurality of network resources 40-44 may be connected to the data communications network 32 and are thus made available to the user 9 through the pocket computer 1. For instance, the network resources may include servers 40 with associated content 42 such as www data, wap data, ftp data, email data, audio data, video data, etc. The network resources may also include other end-user devices 44, such as personal computers.

A second digital network 26 is shown in FIG. 2 in the form of a mobile telecommunications network, compliant with any available mobile telecommunications standard such as GSM, UMTS, D-AMPS or CDMA2000. In the illustrated exemplifying embodiment, the user 9 may access network resources 28 on the mobile telecommunications network 26 through the pocket computer 1 by establishing a wireless link 10b to a mobile terminal 20, which in turn has operative access to the mobile telecommunications network 26 over a wireless link 22 to a base station 24, as is well known per se. The wireless links 10a, 10b may for instance be in compliance with Bluetooth™, WLAN (Wireless Local Area Network, e.g. as specified in IEEE 802.11), HomeRF or HIPERLAN. Thus, the interface(s) 55 will contain all the necessary hardware and software required for establishing such links, as is readily realized by a person skilled in the art.

Figure 3:
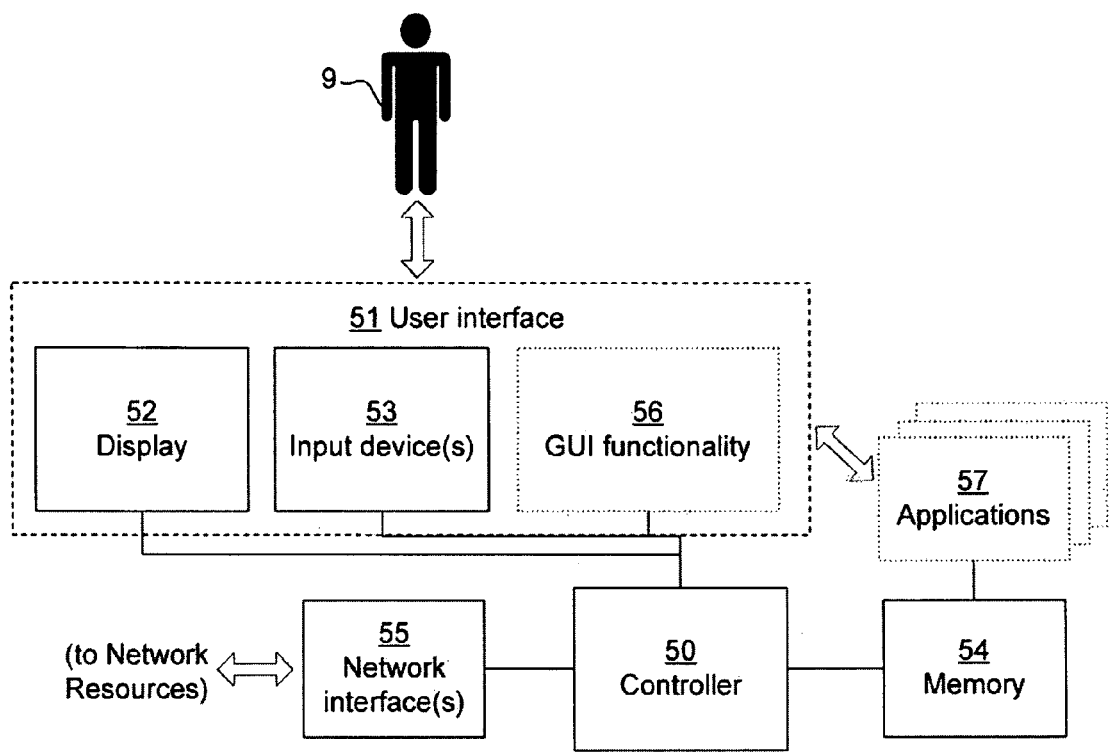
FIG. 3 is a schematic block diagram of the pocket computer according to the previous drawings.

FIG. 3 is a schematic block diagram of the pocket computer according to the previous drawings. As seen in FIG. 3, the pocket computer 1 has a controller 50 with associated memory 54. The controller is responsible for the overall operation of the pocket computer 1 and may be implemented by any commercially available CPU (Central Processing Unit), DSP (Digital Signal Processor) or any other electronic programmable logic device. The associated memory 54 may be internal and/or external to the controller 50 and may be RAM memory, ROM memory, EEPROM memory, flash memory, hard disk, or any combination thereof.

The memory 54 is used for various purposes by the controller 50, one of them being for storing data and program instructions for various pieces of software in the pocket computer 1. The software may include a real-time operating system, drivers e.g. for a user interface 51, as well as various applications 57.

Many if not all of these applications will interact with the user 9 both by receiving data input from him, such as text or navigational input through the input device(s) 53, and by providing data output to him, such as visual output in the form of e.g. text and graphical information presented on the display 52. Non-limiting examples of applications are a www/wap browser application, a contacts application, a messaging application (email, SMS, MMS), a calendar application, an organizer application, a video game application, a calculator application, a voice memo application, an alarm clock application, a word processing application, a spreadsheet application, a code memory application, a music player application, a media streaming application, and a control panel application. GUI (graphical user interface) functionality 56 in the user interface 51 controls the interaction between the applications 57, the user 9 and the user interface elements 52, 53 of the user interface.

Below follows a description related to content display modes. It is to be noted that here the hypermedia pages are represented by web pages. In order for the user to be able to view web pages on a mobile terminal, that were originally intended to be displayed on a personal computer, he/she may need to change the content display mode. For example, a zoom factor, a page layout mode or a frame display mode may be required to be adjusted for the user to be able to customize how content is shown in the display.

Page layout mode is when the user is given an option to either have a normal view or an optimized view. In the normal view, page content is displayed potentially with content to the right of the display view. In the optimized view, the content is rearranged horizontally, such that no content is present outside the display view horizontally.

Figure 4A:
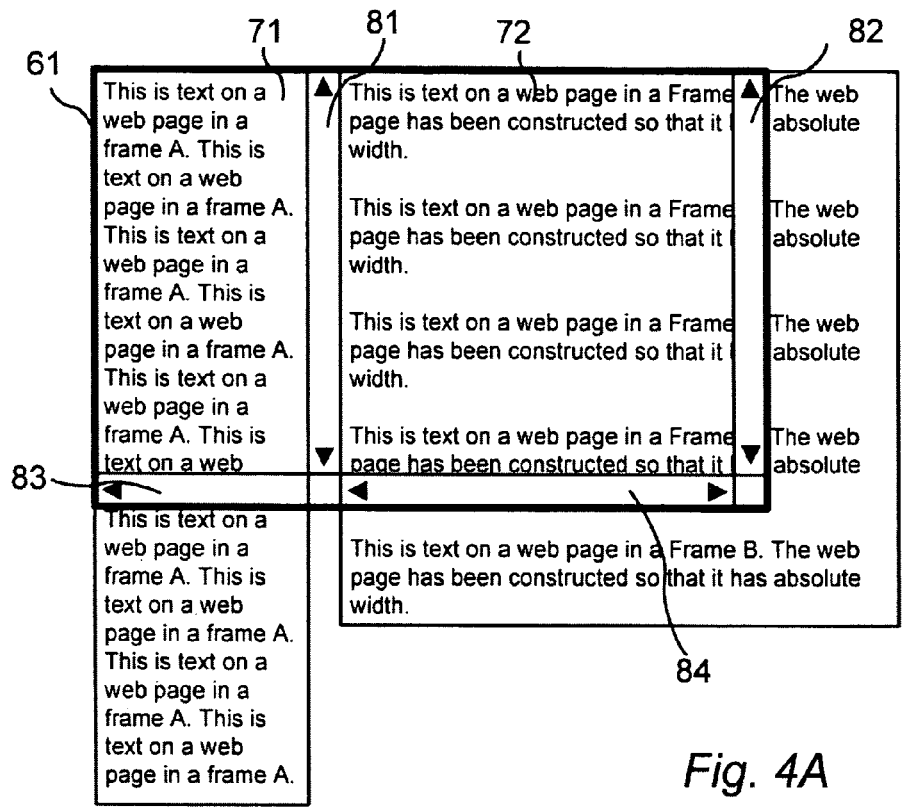
FIGS. 4A, 4B, 4C and 4D illustrate different settings of a content display mode being a frame display mode and a page layout mode in an embodiment of the present invention.
Figure 4B:
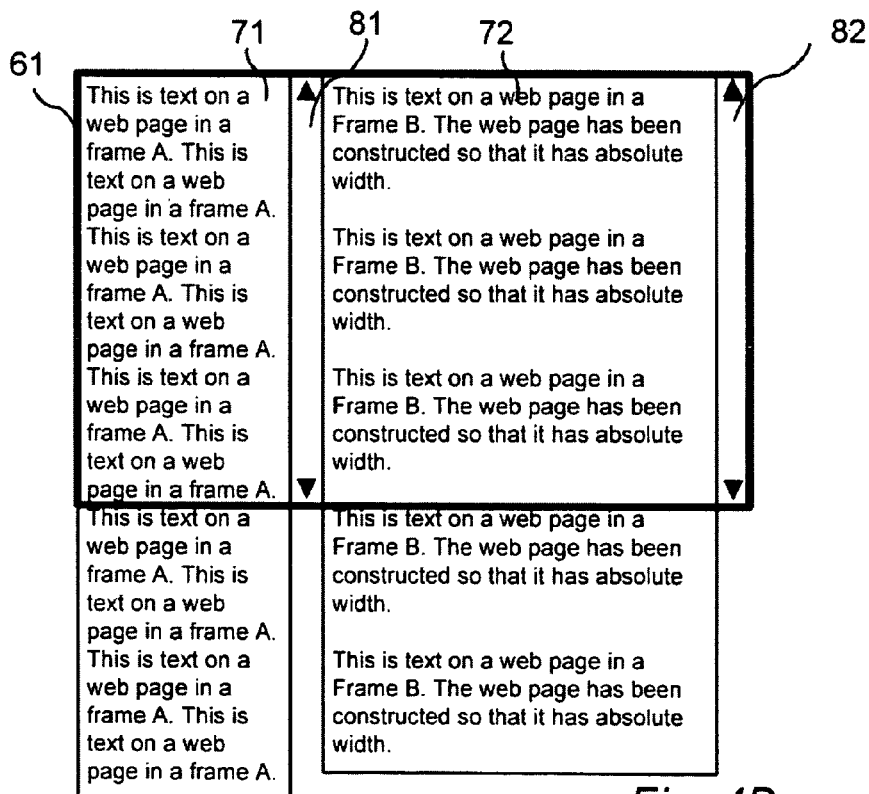
Figure 4C:
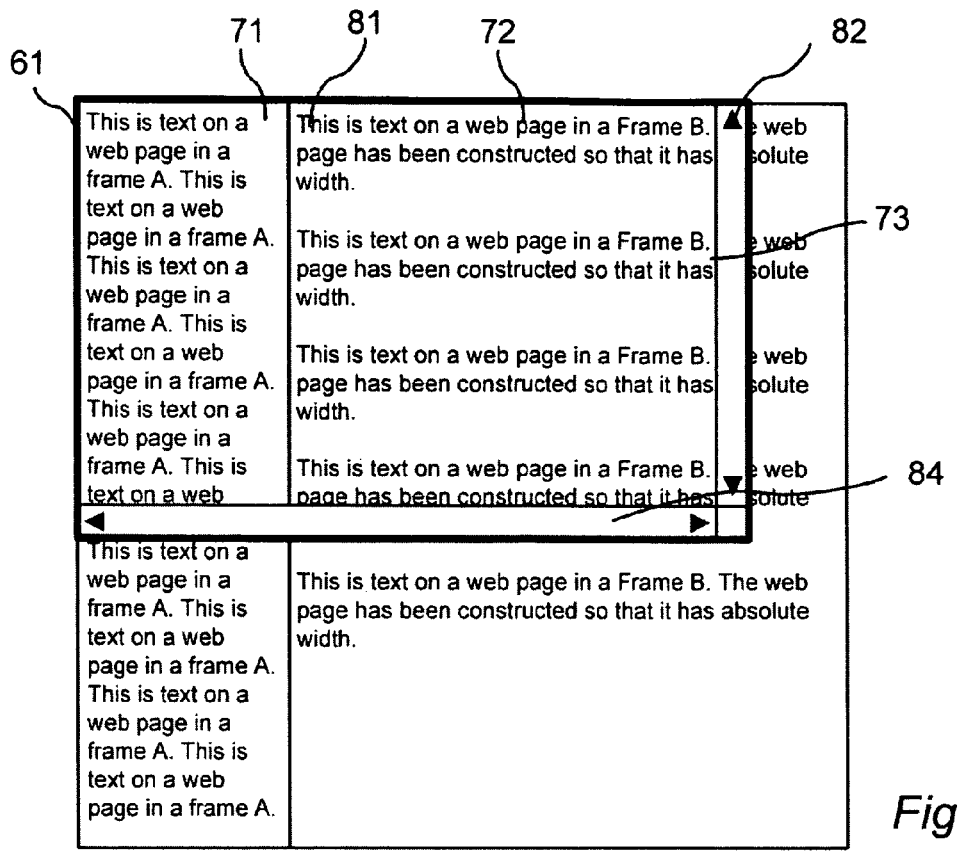
Figure 4D:
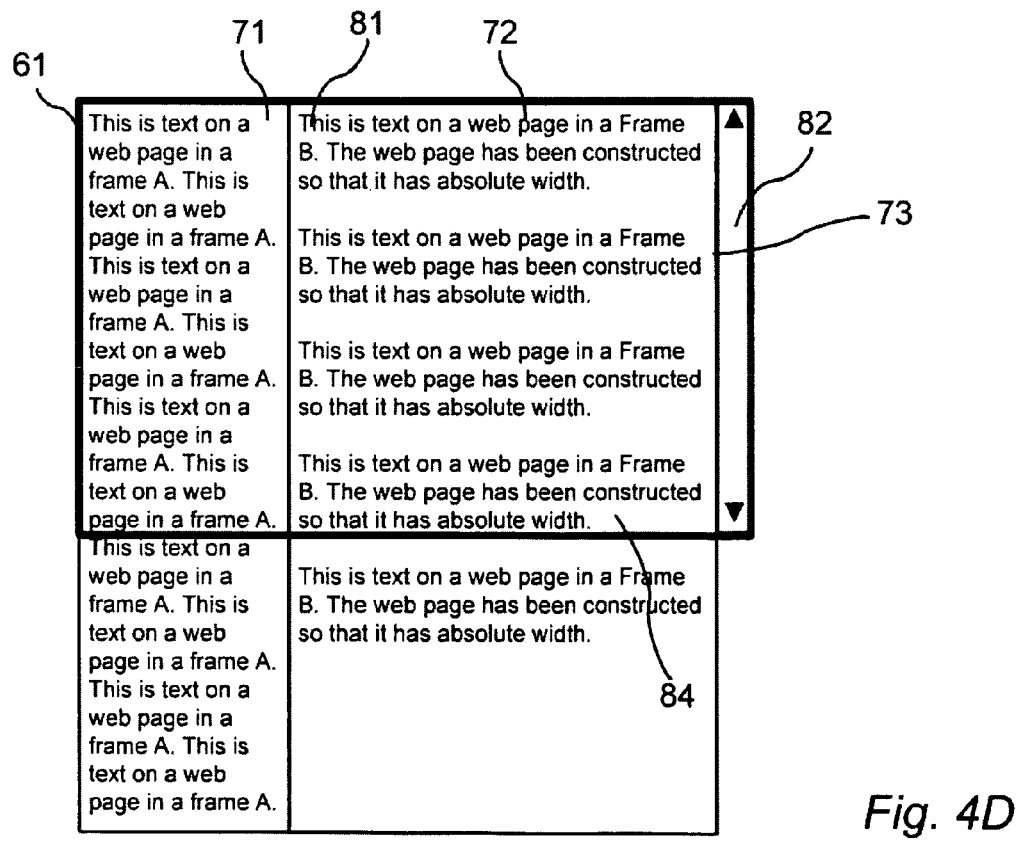

FIGS. 4A, 4B, 4C and 4D illustrate different settings of a content display mode being a frame display mode and a page layout mode in an embodiment of the present invention. When the frame display mode is in merged frames mode, frames are combined to a single frame as can be seen in FIGS. 4C and 4D. When the page layout mode is set to be optimized, text in a frame is adjusted horizontally such that it fits into the visible portion of the frame. The page layout mode is set to be optimized in FIGS. 4B and 4D. Each of the FIGS. 4A, 4B, 4C and 4D will now be described in more detail.

In FIG. 4A, the browser has optimized view disabled and merge frames disabled. A content page being displayed with a first frame 71 on the left of the display view 61, and a second frame 72 on the right. The author of the web page has in this example indicated in the content page code, such as HTML, that the first frame 71 is to be displayed to the left and the second frame 72 is to be displayed to the right. As can be seen in FIG. 4A, this first display mode takes into account the content page author's instructions about how the frames 71 and 72 should be displayed. Frames 71 and 72 have vertical scroll bars 81 and 82, respectively, and horizontal scroll bars 83 and 84, respectively. If the user indicates a desire to scroll the content using, for example, the navigation key 5a, the frame of the frames 71 and 72 which is currently active will have its content scrolled. Only one frame can be active at any one point in time, resulting in an unpredictable behavior if the user scrolls the content without knowing for certain which frame is active.

In FIG. 4B, the browser has optimized view enabled and merge frames disabled. Here there are still two frames 71 and 72, each having scroll bars 81 and 82, respectively. However, compared to FIG. 4A, there is no content to the right of the display view 61. The content has been rearranged horizontally to fit within the physical boundaries of the right-hand frame 72.

In FIG. 4C, the browser has optimized view disabled and merge frames enabled. Here the contents of the frames 71 and 72 are merged into one merged frame 73 taking up the entire space of the display view 61. While not strictly following the code instructions of the web page, this frame display mode has the advantage of only providing the user with one frame of scrollable content, which may be a preferable way for the user to navigate through the content. This is particularly useful in mobile communication terminals having limited user interfaces. For example, the user may in this frame display mode use the navigation key 5a to unambiguously scroll all of the content currently shown on the display view 61. As the page layout mode is not optimized, content may, as is the case here, exist to the right of the display view 61. The frame 73 then has one vertical scroll bar 82 and one horizontal scroll bar 84.

In FIG. 4D, the browser has optimized view enabled and merge frames enabled. As in FIG. 4C, the contents of the frames 71 and 72 are merged into one merged frame 73 taking up the entire space of the display view 61. Furthermore, the page layout mode is optimized here, whereby no content exists to the right of the display view 61. The frame 73 then only has one vertical scroll bar 82.

Figure 5A:
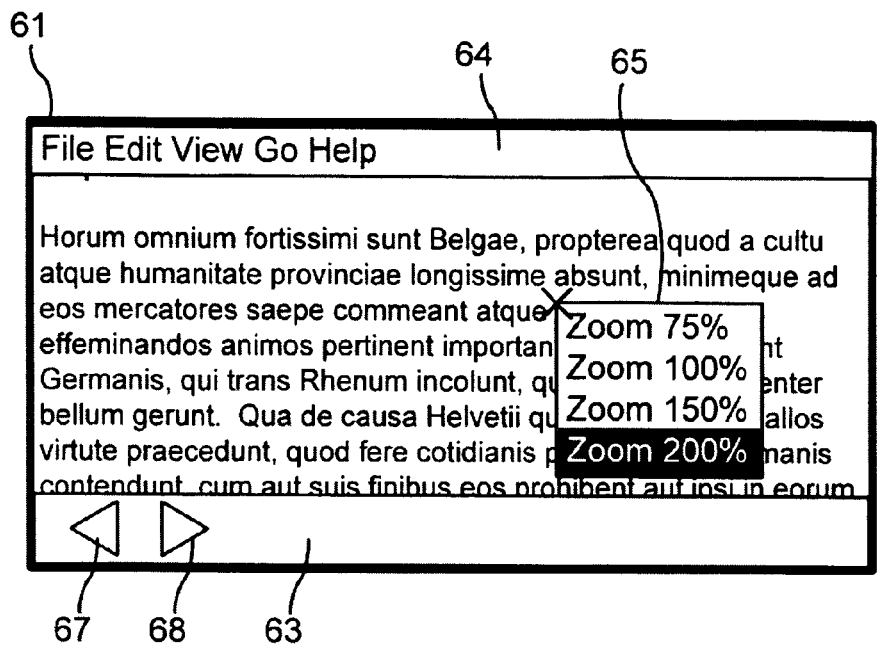
FIGS. 5A and 5B show a display view of a hypermedia browser in the form of a web browser having rendered a first web page in two different content display modes, in this case being zoom factors.
Figure 5B:
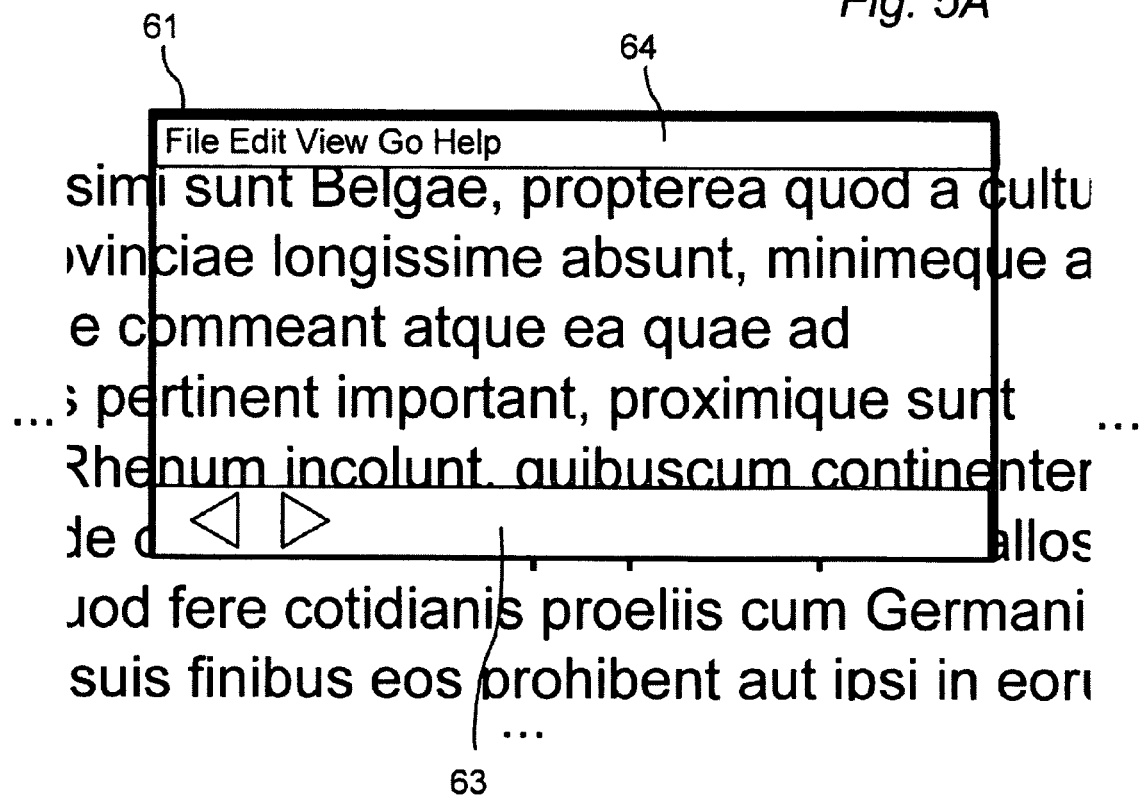
Figure 6A:
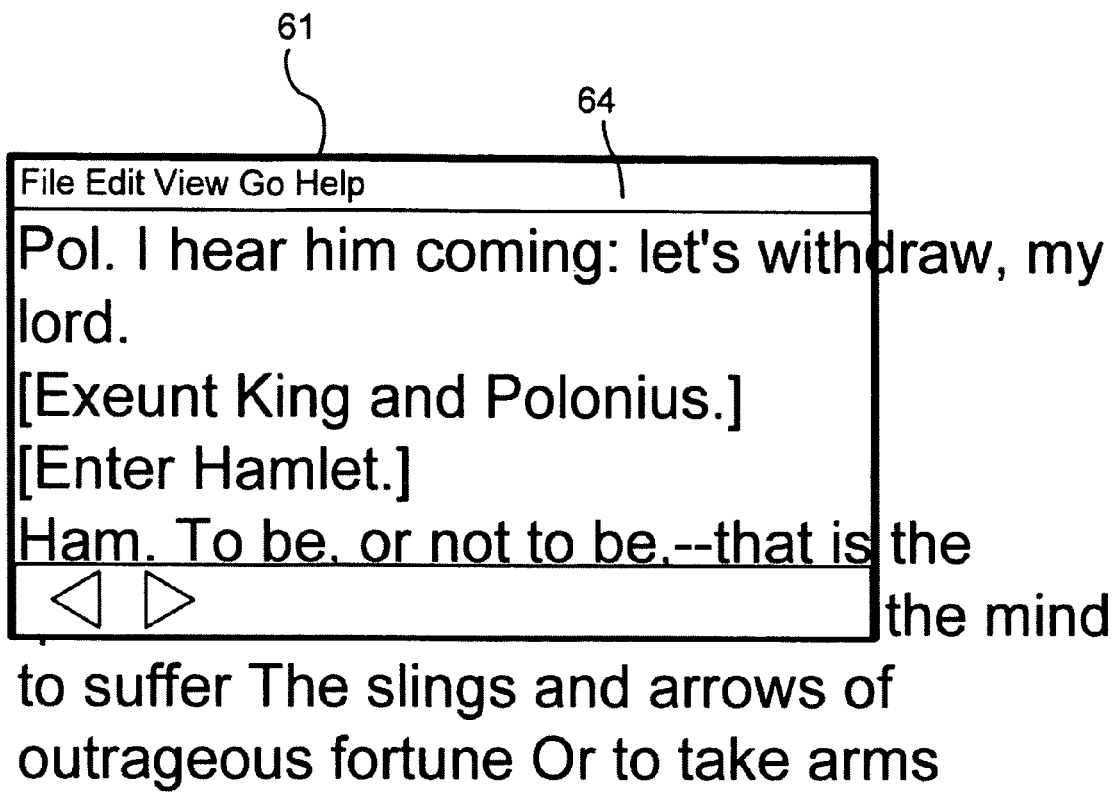
FIGS. 6A and 6B show a display view of the web browser having rendered a second web page in two different content display modes, being different in zoom factors and page layout mode.
Figure 6B:
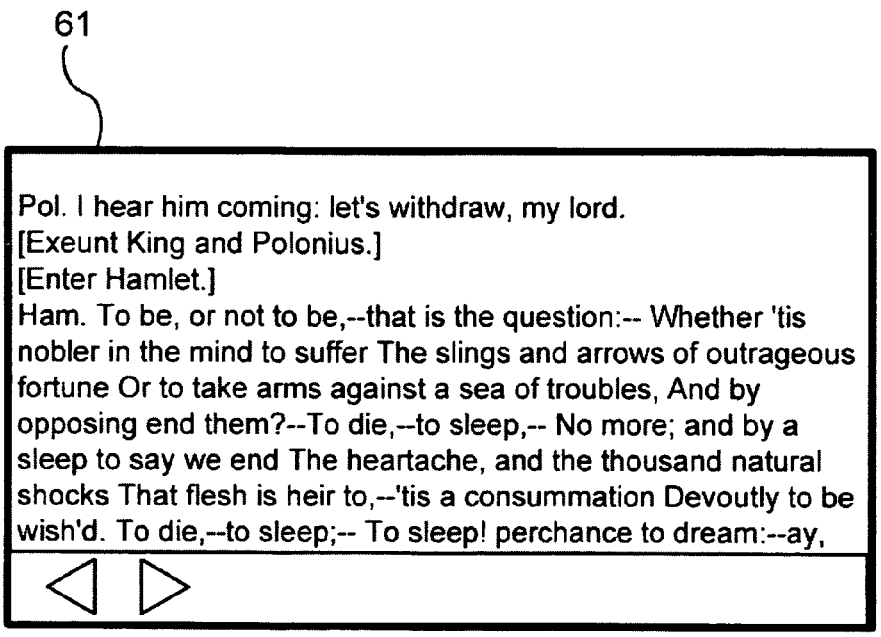

FIGS. 5A and 5B together with FIGS. 6A and 6B are used to illustrate a method of how content display modes associated to web pages are retained.

FIGS. 5A and 5B show a display view of a web browser having rendered a first web page in two different content display modes, in this case being zoom factors. FIGS. 6A and 6B show a display view of a web browser having rendered a second web page in two different content display modes, being a difference in zoom factors and page layout mode.

Although the following example uses the content display modes being a zoom factor and page layout mode, any content display mode may be used accordingly. For example, the content display modes of frame display mode and text selection could alternatively or additionally also be used.

With reference to FIGS. 5A-B and 6A-B, a process will now be disclosed, illustrating how an embodiment of the present invention retains content display modes related to web pages.

As shown in FIG. 5A, the user has navigated to a first page containing content displayed in the display view 61 with an initial zoom factor of 100%. The page layout mode is normal, whereby both a menu bar 61 and a button bar 63 are visible. The button bar comprises a back button 67 and a forward button 68. The user may then, for example, modify the content display mode by modifying the zoom factor to a new zoom factor of 200%, by using a context sensitive menu 65. This results in the web browser re-rendering the content with the new content display mode being a zoom factor of 200% as can be seen in FIG. 5B. The page layout mode remains the same as before, being in normal mode.

The user may then navigate to a second page, using a link on the first page, using a bookmark, by entering a uniform resource locator (URL), or by any other means. FIG. 6A shows a display view 61 on which the browser has rendered the second page with an initial zoom factor of 200% and a normal page layout mode. In other words, the latest active content display mode is used for subsequent page renderings, such as the second page in this example. If the user chooses to change the content display mode, such as by changing the zoom factor to 100%, and by changing the page layout mode to optimized, the second content page is re-rendered according to the new content display mode. In this case this involves rendering the second page with the zoom factor of 100%, arranging the content such that no content exists to the right of the display view 61, as is illustrated in FIG. 6B.

There are now two history items for the two pages stored by the browser. The first page has associated a zoom factor of 200% and normal page layout mode. The second page has associated a zoom factor of 100% and an optimized page layout mode.

The user may then wish to return to the first page, for example using a combination of hardware keys (not shown). Upon the user pressing the combination of hardware keys, the web browser re-renders the first page according to the content display mode associated with the history item for the first page, thereby using a zoom factor of 200% and a normal page layout mode. In other words, the display will again look as shown in FIG. 5B. By keeping content display mode information in memory 54 as part of the browser history, the browser improves the browsing experience for the user. The stored content display information can be used when revisiting already visited pages, either using back or forward functionality by means of the back button 67 or the forward button 68, respectively, commonly provided by web browsers in the art.

FIG. 7 shows an exemplary data table 90 comprising history data according to an embodiment of the present invention.

The data table 90 is used to store history items. The data table 90 is preferably stored in the memory 54, where it is accessible to the controller 50. The table comprises a number of columns, where each column contains one type of data for each record. Records are shown vertically, where each step down in the table 90 corresponds to a new record.

A Uniform Resource Locator (URL) column 91 contains the URL of the history item. A page layout column 92 contains information for each history item about page layout mode. A frame mode column 93 contains information about the frame display mode for each history item. A zoom factor column 94 contains the zoom factor for each history item. A text selection column 95 contains information about any text selections for each history item. The text selection is in this illustrative example represented with two numbers, representing the start and the end of the text selection in terms of character numbers. Although not shown, additional information is preferably included for text selection, such as a reference to the frame with the text being selected, etc. Furthermore, "0,0" here simply denotes that no text selection has been made in the history item in question. Additional columns 96, related to content display modes or other information about the history item, may be added when suitable.

The invention has mainly been described above with reference to a number of embodiments. However, as is readily appreciated by a person skilled in the art, other embodiments than the ones disclosed above are equally possible within the scope of the invention, as defined by the appended patent claims. It is to be noted that the invention may be exercised in other kinds of mobile communication terminals than the pocket computer of FIGS. 1-3, including but not limited to mobile (cellular) telephones and personal digital assistants (PDAs).

The invention claimed is:

1. A method for displaying previously visited hypermedia pages in a hypermedia browser application executing on a mobile communication terminal comprising a display, the method comprising:
   selecting a hypermedia page to be rendered on said display;
   determining if the hypermedia page is associated with a first content display mode in a history item of a browser history of the terminal;
   if the hypermedia page is associated with a first content display mode in the browser history, rendering said hypermedia page according to the first content display mode associated with the hypermedia page in the browser history, the first content display mode comprising a zoom factor;
   if the hypermedia page is not associated with a first content display mode in the browser history, rendering said hypermedia page according to a default content display mode;
   wherein during display of a hypermedia page, enabling zoom modification of the content display mode of the hypermedia page by a user; and
   in response to the zoom modification of the content display mode of the hypermedia page by the user, automatically storing the modified content display mode as the first content display mode associated with the hypermedia page in the browser history such that when the hypermedia page is revisited, the hypermedia page is re-rendered using the automatically stored modified content display mode.

2. A method according to claim 1, wherein said first or default content display mode includes a mode when a text of said hypermedia page is selected.

3. A method according to claim 1, wherein said first or default content display mode includes a page layout mode.

4. A method according to claim 1, wherein said hypermedia page is selected by navigating back through the browser history.

5. A method according to claim 1, wherein said hypermedia page is selected by navigating forward through the browser history.

6. A method according to claim 1, wherein said hypermedia page represents at least one type of content selected from the group consisting of: HyperText Markup Language (HTML) content, Wireless Markup Language (WML) content, Standard Generalized Markup Language (SGML) content and Extensible Markup Language (XML) content.

7. A computer program product embodied in a non-transitory processor usable medium comprising processor readable program code for causing a mobile communication terminal to perform the method according to claim 1.

8. The method of claim 1, wherein the method comprises determining if a Uniform Resource Locator (URL) of the hypermedia page is associated with the first content display mode in a history item of a browser history of the terminal.

9. A mobile communication terminal capable of executing a hypermedia browser application, said hypermedia browser application rendering hypermedia pages on a display of said mobile communication terminal, said mobile communication terminal comprising:
   means for selecting a hypermedia page to be rendered on said display;
   means for determining if the hypermedia page is associated with a first content display mode in a history item in a browser history of the terminal;
   means for rendering said hypermedia page according to a first content display mode associated with the hypermedia page in the browser history, the first content display mode comprising a zoom factor, if the hypermedia page is associated with a first content display mode in the browser history;
   means for rendering said hypermedia page according to a default content display mode if the hypermedia page is not associated with the browser history
   means for enabling zoom modification of the content display mode of a hypermedia page by a user during display of the hypermedia page; and means for automatically storing the zoom modified content display mode as the first content display mode associated with the hypermedia page in the browser history in response to the zoom modification of the content display mode of the hypermedia page by the user such that when the hypermedia page is revisited, the hypermedia page is re-rendered using the automatically stored modified content display mode.

10. An apparatus comprising:

at least one processor; and at least one memory including computer program code, the at least one memory and the computer program code configured to, with the at least one processor, cause the apparatus to perform at least the following:

enabling selection of a hypermedia page to be rendered on a display;

determining if the hypermedia page is associated with a first content display mode in a history item in a browser history of the apparatus;

if the hypermedia page is associated with a first content display mode in the browser history, enabling rendering said hypermedia page according to a first content display mode associated with the hypermedia page in the browser history, the first content display mode comprising a zoom factor;

if the hypermedia page is not associated with a first content display mode in the browser history, enabling rendering said hypermedia page according to a default content display mode;

wherein during display of a hypermedia page, enabling zoom modification of a content display mode of the hypermedia page by a user; and in response to the zoom modification of the content display mode of the hypermedia page by the user, automatically storing the zoom modified content display mode as the first content display mode associated with the hypermedia page in the browser history such that when the hypermedia page is revisited, the hypermedia page is re-rendered using the automatically stored modified content display mode.

* * * * *